W. W. Powers,
Hitching Post.
No. 101,657. Patented Apr. 5, 1870.
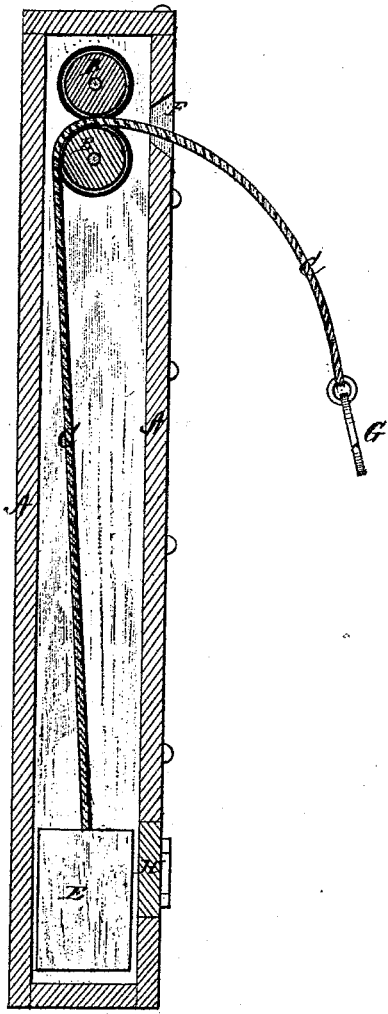
Witnesses
C. L. Evers
A. M. Yeatman
Inventor
Walter W. Powers
per
Alexander & Mason
Attys
N. PETERS, PHOTO-LITHOGRAPHER, WASHINGTON, D. C.

United States Patent Office.

WALTER W. POWERS, OF BELLEVILLE, NEW YORK.

Letters Patent No. 101,657, dated April 5, 1870.

IMPROVED HITCHING-POST.

The Schedule referred to in these Letters Patent and making part of the same

*To all whom it may concern:*

Be it known that I, WALTER W. POWERS, of Belleville, in the county of Jefferson and in the State of New York, have invented certain new and useful Improvements in Device for Haltering Horses; and do hereby declare that the following is a full, clear, and exact description thereof, reference being had to the accompanying drawings and to the letters of reference marked thereon making a part of this specification.

The nature of my invention consists in a device for haltering horses, so that it will be impossible for the horses to become entangled in the halter and thrown down.

In order to enable others skilled in the art to which my invention appertains to make and use the same, I will now proceed to describe its construction and operation, referring to the annexed drawings which form a part of this specification, and which represent a vertical section of my invention.

A represents an oblong box of suitable size and shape, having at its upper end two rollers B B, grooved in their center so that the rope C can pass readily between the same.

One end of the rope C passes downward into the box, and is provided with a weight, E, while the other end passes out through an aperture F, in the front side of the box, and is provided with a snap-hook, G, or other suitable device for attaching to the halter.

Near the lower end of the box A is a hinged door, H, so that easy access may be had to the lower end of the rope and the weight.

The box A may be put up in any desired place in the stall, and the hook G attached to the halter, when the weight E will, of course, at all times, hold the rope sufficiently taut to prevent the horse from being entangled and thrown down, although it, at the same time, does not prevent the horse from moving its head in any way.

I am aware that an open-top case, provided with a pulley, over which passes a cord having a weight attached, is not new. This device is provided with no means of access to the box should the weight break loose from the chain, while the pulley is connected to one side of and above the top of the case.

My invention has a door at the bottom of the case, and is provided with two grooved pulleys inclosed in a tight case, with an opening for the rope to pass.

No hay or dirt can get in the box to obstruct the passage of the weight.

What I claim is—

The oblong box A, closed at the top and bottom, and provided with front opening F and door H at the bottom, inclosing the two grooved pulleys B B, rope C, and weight E, all as shown and described.

In testimony that I claim the foregoing, I have hereunto set my hand this 19th day of August, 1869.

WALTER W. POWERS.

Witnesses:
    JAMES E. GREENE,
    E. B. POWERS.